(12) United States Patent
Takaragi et al.

(10) Patent No.: US 7,139,759 B2
(45) Date of Patent: Nov. 21, 2006

(54) METHOD AND A DEVICE FOR MANAGING A COMPUTER NETWORK

(75) Inventors: Kazuo Takaragi, Ebina (JP); Seiichi Domyo, Fujisawa (JP); Hiroshi Yoshiura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 09/897,400

(22) Filed: Jul. 3, 2001

(65) Prior Publication Data
US 2002/0016928 A1 Feb. 7, 2002

Related U.S. Application Data

(63) Continuation of application No. 09/155,153, filed as application No. PCT/JP96/00754 on Mar. 22, 1996, now Pat. No. 6,311,277.

(51) Int. Cl.
G06F 17/30 (2006.01)
H04L 9/00 (2006.01)

(52) U.S. Cl. ......................................... 707/10; 713/164
(58) Field of Classification Search ................ 713/200, 713/201, 170, 151, 168, 164; 380/4; 709/223; 717/126; 719/313; 707/10; 705/64
See application file for complete search history.

(56) References Cited

U.S. PATENT DOCUMENTS

| 5,369,707 A | 11/1994 | Follendore, III | 380/25 |
|---|---|---|---|
| 5,440,723 A | 8/1995 | Arnold et al. | |
| 5,577,209 A | 11/1996 | Boyle et al. | 709/230 |
| 5,708,709 A * | 1/1998 | Rose | 705/59 |
| 5,724,425 A | 3/1998 | Chang et al. | 380/25 |
| 5,832,228 A | 11/1998 | Holden et al. | 709/225 |
| 5,935,246 A * | 8/1999 | Benson | 713/200 |
| 5,978,579 A * | 11/1999 | Buxton et al. | 717/107 |

(Continued)

FOREIGN PATENT DOCUMENTS

JP 7281980 10/1995

(Continued)

OTHER PUBLICATIONS

O. Kephart, A Biologically Inspired Immune System for Computers, Artificial Life, MIT Press, 1994, pp. 1-10.

(Continued)

*Primary Examiner*—Hosain Alam
*Assistant Examiner*—Joon Hwan Hwang
(74) *Attorney, Agent, or Firm*—Mattingly, Stanger, Malur & Brundidge, P.C.

(57) ABSTRACT

A method and a device for managing a computer network, especially a technique for ensuring the security of a network. A computer network system in which computers are connected to each other through transmission lines, each computer stores the data which constitutes a moving type software exclusively used for security and transmitted together with a message when the computer transmits the message to another computer of the system, and executes the moving type software by using the stored data upon receiving a message from another computer.

15 Claims, 8 Drawing Sheets

U.S. PATENT DOCUMENTS

| | | | | |
|---|---|---|---|---|
| 6,092,194 | A * | 7/2000 | Touboul | 713/200 |
| 6,108,420 | A * | 8/2000 | Larose et al. | 705/59 |
| 6,148,401 | A * | 11/2000 | Devanbu et al. | 713/170 |
| 6,154,844 | A * | 11/2000 | Touboul et al. | 713/201 |
| 6,175,924 | B1 * | 1/2001 | Arnold | 713/189 |
| 6,195,794 | B1 * | 2/2001 | Buxton | 717/108 |
| 6,263,362 | B1 * | 7/2001 | Donoho et al. | 709/207 |
| 6,263,442 | B1 * | 7/2001 | Mueller et al. | 713/201 |
| 6,272,469 | B1 * | 8/2001 | Koritzinsky et al. | 705/2 |
| 6,311,277 | B1 * | 10/2001 | Takaragi et al. | 713/201 |
| 6,381,698 | B1 * | 4/2002 | Devanbu et al. | 713/170 |
| 6,424,718 | B1 * | 7/2002 | Holloway | 380/277 |

FOREIGN PATENT DOCUMENTS

| | | |
|---|---|---|
| JP | 8-63352 | 3/1996 |

OTHER PUBLICATIONS

O. Kephart, et al., Biologically Inspired Defenses Against Computer Viruses, Aug. 20-25, 1995, pp. 985-996.

Kephart, et al., "Biologically Inspired Defenses Against Computer Viruses", High Integrity Computing Laboratory, IBM Thomas J. Watson Research Center, 1995.

Kephart, "A Biologically Inspired Immune System for Computers", High Integrity Computing Laboratory, IBM Thomas J. Watson Research Center, 1994.

* cited by examiner

LEGEND ○ SUSPICIOUS
● INJUSTICE IN PROCESS
◉ PARAMETER FOR COUNTERMEASURE ALREADY SET "STERILIZATION SIGNAL" IN TRANSMISSION
◎ PARAMETER FOR COUNTERMEASURE ALREADY SET

METHOD AND A DEVICE FOR MANAGING A COMPUTER NETWORK

This application is a Rule 53(b) continuation of U.S. application Ser. No. 09/155,153, filed Sep. 22, 1998, the subject matter of which is incorporated herein by reference. U.S. application Ser. No. 09/155,153 is the U.S. National Stage of International Application No. PCT/JP96/0054, filed Mar. 22, 1996.

TECHNICAL FIELD

The present invention relates to a method of and a device for managing a computer network, and in particular, to a technique for ensuring the security of a network.

BACKGROUND ART

With development of open and global environments of computer communication such as the Internet, there occur an increasing number of unjustified practices, for example, to steal a glance at communication data or to falsify the data. Moreover, when a countermeasure is devise for an injustice, there immediately appears another trick for the injustice. Namely, there occurs a spiral of injustice and countermeasure. Compared with the conventional system of the past in which business and operation are carried out in a closed network of a firm, there exists an increased number of chances of unknown injustices in the system of today using the open environments. Consequently, there has been desired a new countermeasure which is not associated with a simple extension of the prior art. Turning out eyes to the immune system of the human body, the immune system prevents quite a large number of bacteria and viruses from entering the human body although there exist some exceptions. Additionally, even there appears an unknown bacterium or virus not existing in the space at present, the immune system can anyhow cope with such bacterium or virus. Assuming the human body to be a computer network and the bacteria and viruses to be injustices of various tricks, it is to be appreciated that there is required an immune system for the network. That is, it is desired to implement a function, like the immune system of the human body, to cope with a large number of unknown injustices taking place in the computer network.

An article "A Biologically Inspired Immune System For Computers" written by Jeffrey O. Kephart and published from MIT Press in 1994 has disclosed heretofore a method of detecting and coping with injustices in a computer network.

Figure 9:
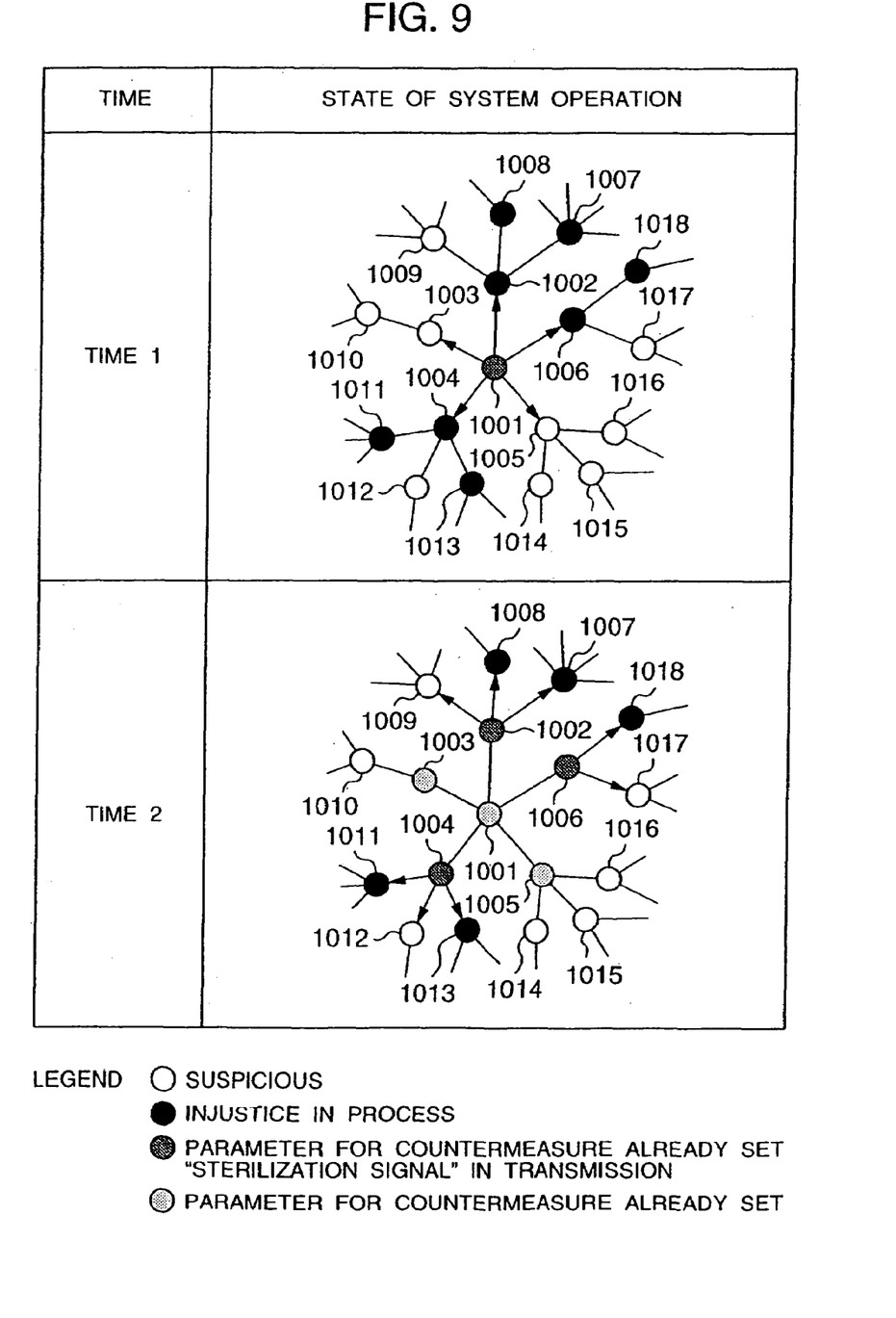
FIG. 9 is a diagram for explaining a conventional security system.

FIG. 9 shows a conventional method. In FIG. 9, reference numerals 1001 to 1018 respectively indicate computers each including a communicating function.

Assume that a computer virus enters the computer 1001 at time 1 and is rejected, and hence the computer 1001 is immune to the computer virus. In the immunized state, the computer retains a state in which the computer memorizes associated information to immediately cope with another invasion of the same computer virus. In this situation, the computer 1001 sends a "sterilization signal" to the computers 1002 to 1006 adjacent thereto. The sterilization signal notifies that the computer of the transmission source is infected with the computer virus and includes a scanning symbol string and restoring information useful for the receiving computer to detect and cope with the computer virus. Assume that among the computers 1002 to 1006 having received the sterilization signal, the computers 1002, 1004, and 1006 have already been infected with the computer virus. Furthermore, it is assumed that the computers 1007, 1008, 1011, 1013, and 1018 have also been infected with the computer virus at time 1.

At time 2, the computers 1002 to 1006 beforehand infected with the computer virus repulse the virus in accordance with the sterilization signal to obtain immunity against the virus. Thereafter, the computers 1002 to 1006 further send the sterilization signal to the adjacent computers. Although the computers 1003 and 1005 not infected with the virus obtain immunity against the virus in accordance with the sterilization signal, these computers do not further send the sterilization signal to the adjacent computers.

In this method, if the speed of propagation of the sterilization signal through the network is higher than the infection speed of the computer virus, it is possible to prevent infection of the computer virus to some extent.

However, the known example is attended with the following drawbacks or problems.

First, when two or more points are infected with the computer virus in an initial stage, the method cannot satisfactorily cope with the infection of the virus. For example, if the infection takes place in the computer 1010 in addition to the computer 1001 in FIG. 10, the sterilization signal from the computer 1001 is not passed to the computer 1010 and hence it is impossible to repulse the virus in the computer 1010. As a result, there exits a fear that the computer virus infected from the computer 1010 possibly invades the network via another adjacent computer beyond the computer 1010. Namely, although the computer virus is detected in the computer 1001 as the first virus infection place and the countermeasure is thus known, it is impossible to sufficiently utilize information of the event for the prevention of infection with the virus.

Second, the sterilization signal is not completely reliable. For example, the computer 1002 is invaded by the computer virus at time 1 and is hence partly unreliable. It cannot be confirmed at time 2 that the computer 1002 is completely recovered. The computer 1008 operates in response to the sterilization signal declared by the computer 1002. Actually, however, the computer 1002 is not yet completely recovered at this point, and hence there is a fear that the computer 1002 sends an incorrect "sterilization signal" to deteriorate the overall network, which is not the object of the signal. In a paragraph of the conclusion of the article above, this point has been described as a problem to be solved in the future.

Third, consideration has been given only to injustices of computer viruses. For example, an attempt of an unauthorized access from an external device to the computer has not been taken into consideration. Such an injustice other than the computer virus cannot be sufficiently coped with by the transmission of the sterilization signal. Depending on cases, it is necessary to transmit a countermeasure software for its execution. Moreover, if a "suppression signal" to suppress operation at appropriate timing is not supplied to the countermeasure software, there possibly increases the chance of runaway of the software or the like to damage normal functions. However, this point has not been described in the above article.

Fourth, the method provides only insufficient quarantine for data from an external network. Heretofore, software called a firewall is installed in a place to be connected via the external network; alternatively, when a magnetic disk or a compact disk is mounted, there is introduced a vaccine software to prevent a program conducting injustices from entering the associated computers. However, in the present stage of art, there exists neither means to confirm reliability of the setting of the firewall nor means to guarantee management in which the latest vaccine software is activated in each computer.

Fifth, the quarantine is insufficient for data having possibility of injustice. The conventional vaccine software (fixed type security dedicated software) detects, in accordance with past instances of sufferings, a virus by use of a data layout characteristic to data when the virus is parasitic on a file system or a memory. In consequence, it is impossible at present to detect injustices caused by a virus of a new type.

It is therefore an object of the present invention to provide a method of and a device for managing a computer network capable of coping with simultaneous invasion of computer viruses at a plurality of positions of the computer network.

Another object of the present invention is to provide a method of and a device for managing a computer network capable of ensuring the reliability of a security software.

Still another object of the present invention is to provide a method of and a device for managing a computer network capable of suppressing a possible runaway of a security software.

Further another object of the present invention is to provide a method of and a device for managing a computer network capable of improving safety for data from an external network.

Another object of the present invention is to provide a method of and a device for managing a computer network capable of immediately detecting outbreak of a computer virus of a new type.

DISCLOSURE OF INVENTION

To solve the above problem of the prior art, the present invention utilizes the following means.

(1) In each computer coupled with a network, there is installed a fixed type security dedicated module or a moving type security dedicated software to detect an injustice and/or to work out a countermeasure. In this case, when a computer sends an E-mail or a message such as database access data, the moving type security dedicated software is automatically added to the E-mail or data. When the message arrives at the destination, the software is separated therefrom such that the function of the moving type security dedicated software is executed by the fixed type security dedicated module of the destination computer. The moving type security dedicated software is of a promotion type or a non-promotion type. Since the promotion-type software produces a new copy thereof for each transmission destination before the transmission thereof, the copy can be transferred through the entire network at a possibly highest speed. This accordingly solves the first drawback above.

(2) The moving type security dedicated software and security notification data include their own digital signature and hence are verified in either one of the following operations.

(a) In accordance with the digital signature, the fixed type security dedicated module of the destination computer conducts verification to confirm that the moving type security dedicated software and the security notification data have not been falsified.

(b) The moving type security dedicated software periodically verifies itself to determine whether or not the security notification data thereof has been falsified. If it is determined that the data has been falsified, the software changes the contents thereof through a rewrite operation to invalidate itself.

(c) Any other moving type security dedicated software conducts verification by the digital signature to determine that the software has not been falsified.

With this provision, the second drawback above is solved.

(3) As a result of execution, the moving type security dedicated software outputs the security notification data of "acceleration" or "suppression". The output data is communicated via the fixed type security dedicated module to other fixed type security dedicated modules. When the data indicates "acceleration", the moving type security dedicated software in the inactivation list is moved to the activation list and hence the priority level of the moving type security dedicated software in the activation list becomes higher. When the data indicates "suppression", the moving type security dedicated software in the activation list is moved to the inactivation list or the moving type security dedicated software rewrites itself for the invalidation thereof. In this situation, the activation and inactivation lists are kept retained in the fixed type security dedicated module. If there exists a moving type security dedicated software in the activation list, the software is executed. A moving type security dedicated software existing in the inactivation list is deleted therefrom when the software is not executed for a predetermined period of time. This resultantly solves the third drawback above.

(4) Each computer is provided with the fixed type security dedicated software to conduct a check for the determination of a computer in which the moving type security dedicated software is activated. When data is introduced from an external system, the data is copied onto the computer with the activated software for the sterilization thereof so that the sterilized data is introduced to the objective computer.

(5) The moving type security dedicated software memorizes the configuration of any computer which the software visited before. The software (determines particularly suspicious data) among new data added or among the updated data and moves the data to a computer exclusively used for execution to thereby quarantine the data from the network. When an injustice occurs due to a virus after the quarantine, a human manager will work out a countermeasure. If no infection is detected for a predetermined period of time, the data is returned to the original computer. With the provision, the fifth drawback is solved.

That is, in accordance with the present invention, there is provided a computer network managing method for use in a computer network in which a plurality of computers are connected to each other via transmission lines. When each of the computers sends a message to another computer selected from the computers, said each computer memorizes and keeps therein data forming a moving type security dedicated software, said data being added to the message for transmission thereof. When said each computer receives the message from said another computer, said each computer executes said moving type security dedicated software in accordance with said data forming said moving type security dedicated software, said data being added to the message.

Moreover, in accordance with the present invention, there is provided a computer network managing device for use in a computer network in which a plurality of computers are connected to each other via transmission lines. Each of the computers includes data forming a moving type security dedicated software, said data being added, when said each computer sends a message to another computer selected from the computers, to the message for transmission thereof, and a fixed type security dedicated module for executing, when said each computer receives the message from said another computer, said moving type security dedicated software in accordance with said data forming said moving type security dedicated software, said data being added to the message.

BEST MODE FOR CARRYING OUT THE INVENTION

Referring now to the drawings, description will be given of an embodiment in accordance with the present invention.

Figure 1:
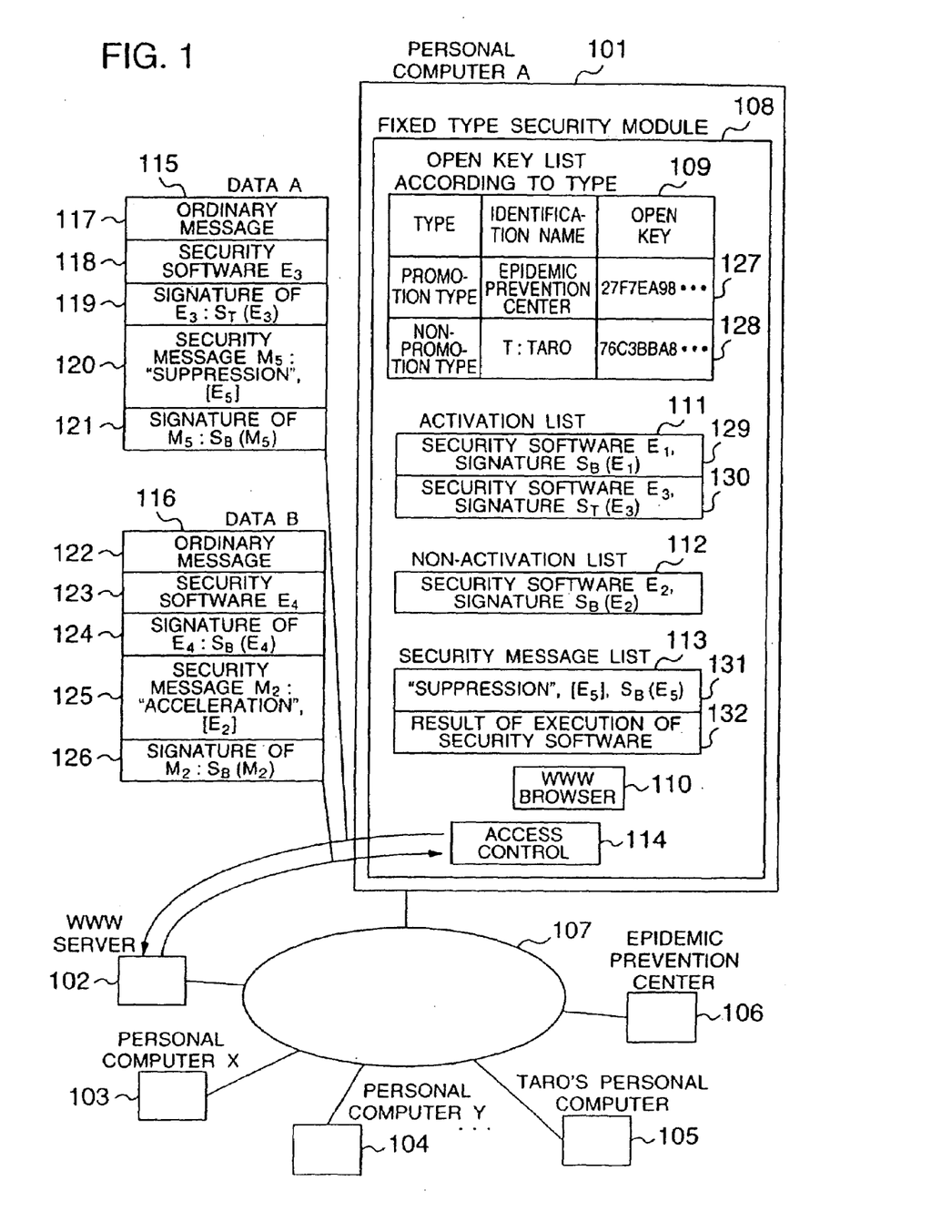
FIG. 1 is a diagram showing constitution of a computer network system in an embodiment in accordance with the present invention.

FIG. 1 shows the configuration of an embodiment of the present invention in which a personal computer A 101, a WWW server 102, personal computer X 103, personal computer Y 104, Taro's personal computer 105, and a computer 106 as an epidemic prevention center are connected to a network 107. Personal computer A 101 includes a fixed-type security module 108 in which an open key list according to type 109, an activation list 111, an inactivation list 112, a security message list 113, a WWW browser 110, and an access control unit 114 are arranged.

The access control unit 114 controls communication of data between the fixed type security module 108 and an external device. The data is to be outputted from or to be inputted to the WWW browser 110. The control unit 114 inhibits any unauthorized access to the module 108.

The WWW browser 110 outputs data A 115 to the WWW server 102 and receives data B 116 therefrom.

Data A 115 includes, in addition to an ordinary message 117 usually communicated between the WWW server 102 and the WWW browser 110, security software E3 118, digital signature ST (E3) 119 for security software E3 generated by the Taro's personal computer 105, security message M5 120 including a character string of "suppression" and "E5", and digital signature SB (M5) 121 for security message M5 120 generated by the epidemic prevention center 106.

Data B 116 includes, in addition to an ordinary message 122 usually communicated between the WWW server 102 and the WWW browser 110, security software E4 123, digital signature SB (E4) 124 for security software E4 generated by the epidemic prevention center 106, security message M2 125 including a character string of "acceleration" and "E2", and digital signature SB (M2) 126 for security message M2 125 generated by the epidemic prevention center 106.

The activation list 111 is a stack of first-in-first-out type in which data is sequentially inputted to be accumulated beginning at the upper-most position and from which data is sequentially outputted beginning at the lower-most position. Accumulated at the upper-most position is a pair 129 of security software E1 and its digital signature SB (E1). At the second position, there is stored a pair 130 of security software E3 and its digital signature ST (E3).

The inactivation list 112 is a stack similar to that described above. Stored in the list 112 is a pair of security software and its digital signature SB (E2).

The security message list 131 is a stack similar to that described above. Stored in the list 131 is a pair of a character string including "suppression" and "E5" and its digital signature SB (E2).

In the open key list according to type 109, there are set open key "27F7EA98 . . . ." 127 of identification name "B: Epidemic prevention center" for type "promotion" and open key "76C3BBA8 . . . ." 128 of identification name "T: Taro" for type "non-promotion". Open key "27F7EA98 . . . ." 127 of "B: Epidemic prevention center" is used to verify validity of digital signature SB (.) such as SB (E1) 129 or SB (E2) 112 generated by the epidemic prevention center 106. Open key "76C3BBA8 . . . ." 128 of "T: Taro" is adopted to verify validity of digital signature ST (.) such as ST (E3) 130 generated by the Taro's personal computer 105.

Figure 2:
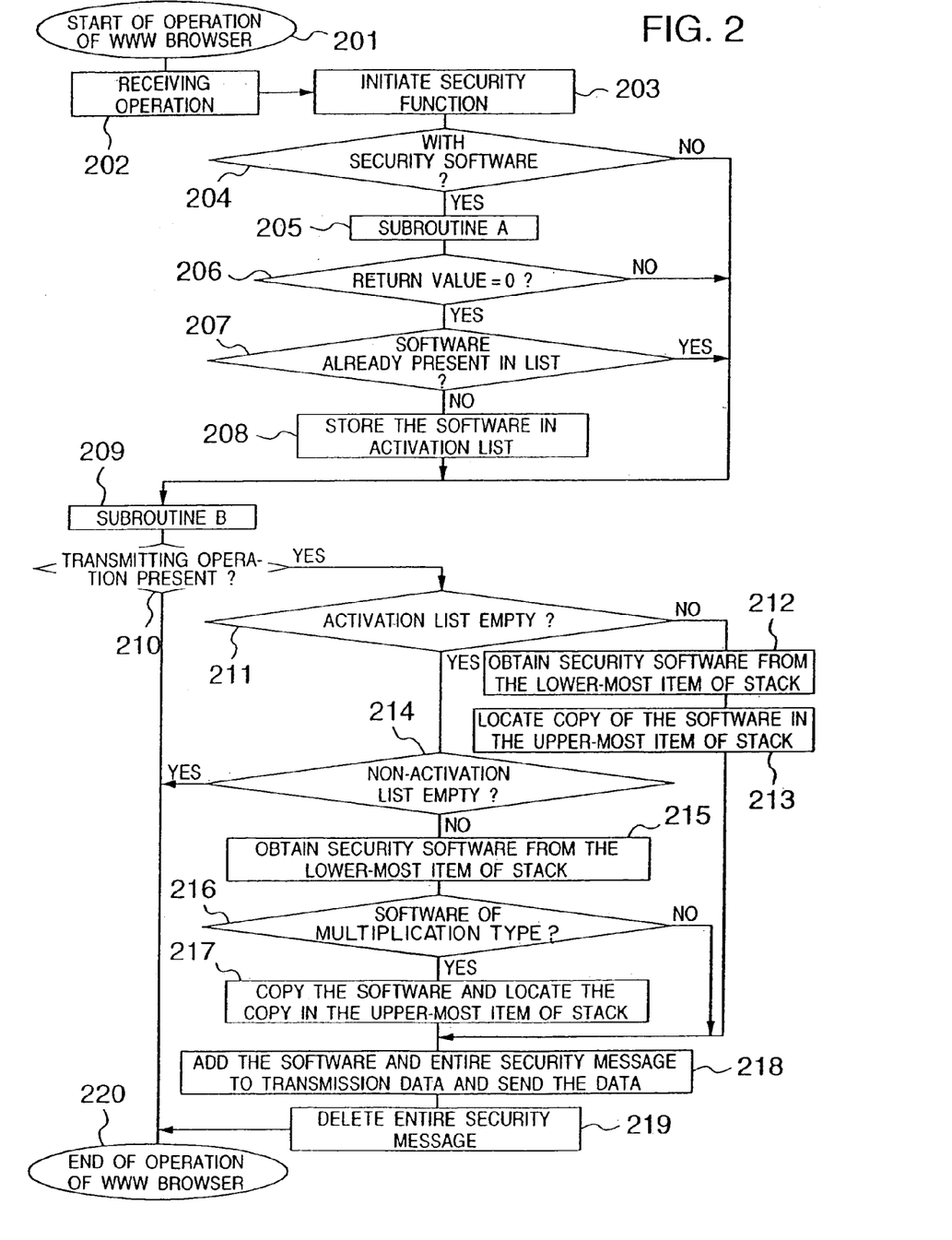
FIG. 2 is a flowchart showing a processing procedure of a security agent.

FIG. 2 shows a processing flow of the WWW browser 110 when data A 115 and data B 116 are communicated between the personal computer A 101 and the WWW server 102. In step 201, the browser 110 starts its operation. In step 202, the browser 110 executes a receiving operation. In step 203, the browser 110 initiates operation of the security function. In step 204, the browser 110 then conducts a check to determine whether or not a security software is added to the received data. If the software is present, control is passed to processing of step 205; otherwise, control is transferred to processing of step 209.

In step 205, the browser 110 executes subroutine A. In step 206, control is passed to processing of step 207 if the return value from subroutine A is 0. Otherwise, control is passed to processing of step 209. In step 207, the browser 110 checks to determine whether or not a security software similar to the received security software has already been registered to the activation list 111 or the inactivation list 112. If such a software is present, control is transferred to step 208; otherwise, control is passed to step 209.

In step 208, the browser 110 adds the received security software to the stack of activation list 111 at the upper-most position. In step 210, the browser 110 makes a check to determine whether or not a transmitting operation is to be conducted. If this is the case, control is transferred to step 211; otherwise, control is passed to step 220. In step 211, the browser 110 checks to determine whether or not the activation list 111 is empty. If empty, control is passed to step 214; otherwise, control is transferred to step 212.

In step 212, the browser 110 acquires a security software from the stack of activation list 111, the software existing at the lower-most position thereof. In step 213, the browser 110 produces a copy of the security software and returns the copy to the original position of the stack of activation list 111. Control is then passed to step 218.

In step 214, the browser 110 checks to determine whether or not the inactivation list 112 is empty. If empty, control passed to step 220; otherwise, control is transferred to step 215. In step 215, the browser 110 acquires a security software from the stack of inactivation list 112, the software existing at the lower-most position thereof. In step 216, the browser 110 checks to determine whether or not the security software is of the multiplication type. If this is the case, control is passed to step 217; otherwise, control is transferred to step 218.

In step 217, the browser 110 produces a copy of the security software and then returns the copy to the original position of the stack of inactivation list 112. In step 218, the browser 110 adds the security software to the transmission data and then transmits the resultant data therefrom. In step 219, the browser 110 executes subroutine B. Thereafter, the WWW browser terminates its operation in step 220.

Figure 3:
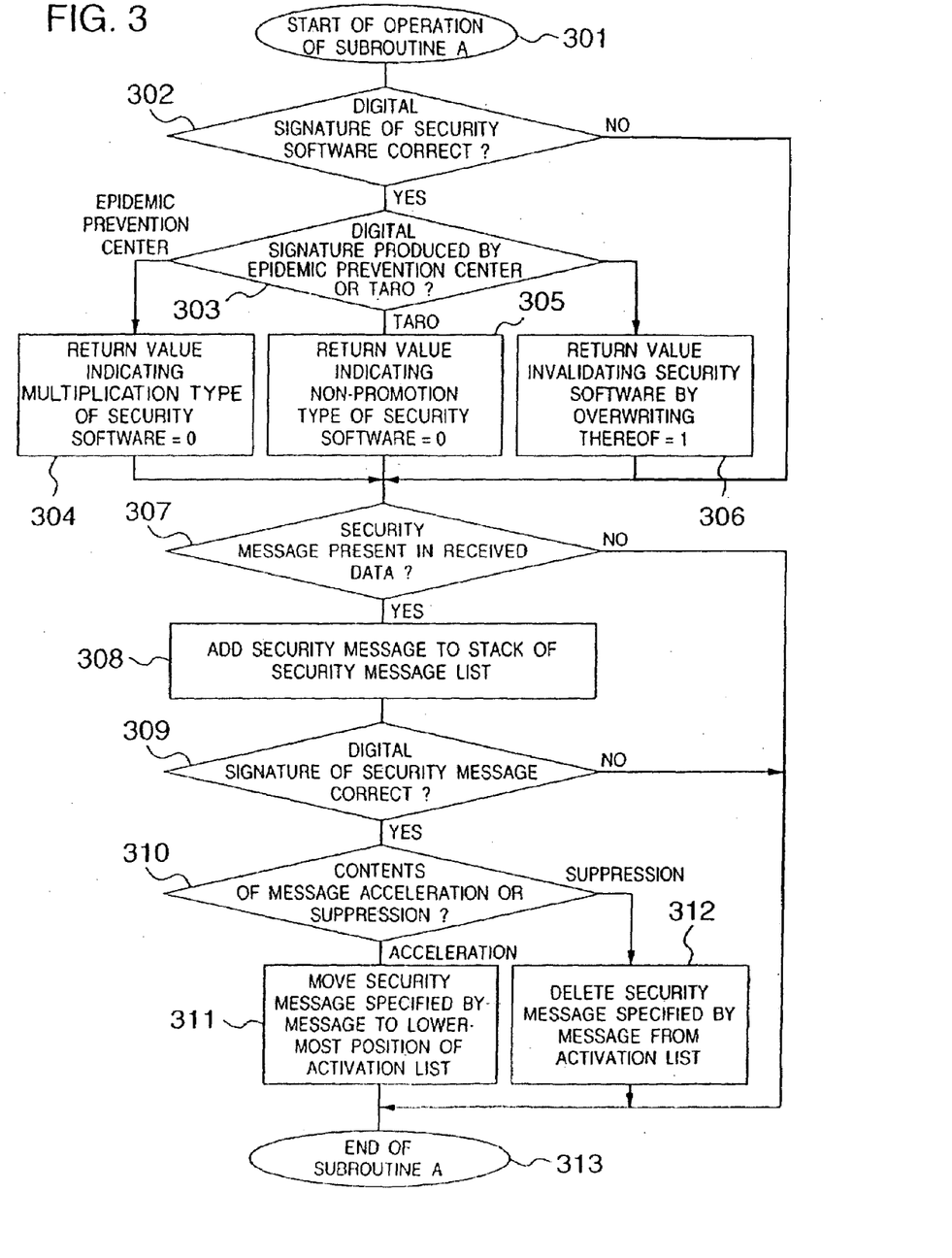
FIG. 3 is a flowchart showing another processing procedure of the security agent.

FIG. 3 shows a processing flow of subroutine A 205. Description will now be given of processing by referring to the flowchart.

In step 301, subroutine A starts operation thereof. In step 302, a check is carried out to determine whether or not the digital signature added to the security software is valid. If valid, control is passed to step 303; otherwise, control is transferred to step 307. In step 303, control is passed to step 304 if the digital signature has been generated by the epidemic prevention center 106. If the signature has been generated by the Taro's personal computer 105, control is transferred to step 305. Otherwise, control is passed to step 306.

In step 304, subroutine A determines that the security software is of the multiplication type and then sets the return value to 0. In step 305, subroutine A determines that the security software is of the non-promotion type and then sets the return value to 0. In step 306, subroutine A writes a meaningless character string over the security software to thereby invalidate the software and then sets the return value to 1. In step 307, subroutine A checks to determine whether or not a security message is added to the received data. If the message is present, control is passed to step 308; otherwise, control is transferred to step 313.

In step 309, subroutine A checks to determine whether or not the digital signature of the security message is valid, namely, whether or not the digital signature has been generated by the epidemic prevention center. If valid, control is transferred to step 310; otherwise, control is passed to step 313.

Instep 310, control is passed to step 311 if the security message contains "acceleration". If "suppression" is contained, control is passed to step 312. In step 311, if the security software specified by the security message exists in the activation or inactivation list, subroutine A moves the software to the lower-most position of the activation list. Otherwise, subroutine A passes control to step 313. In step 312, if the security software specified by the security message exists in the activation or inactivation list, subroutine A deletes the software. Otherwise, subroutine A passes control to step 313. Thereafter, subroutine A terminates its operation in step 313.

Figure 4:
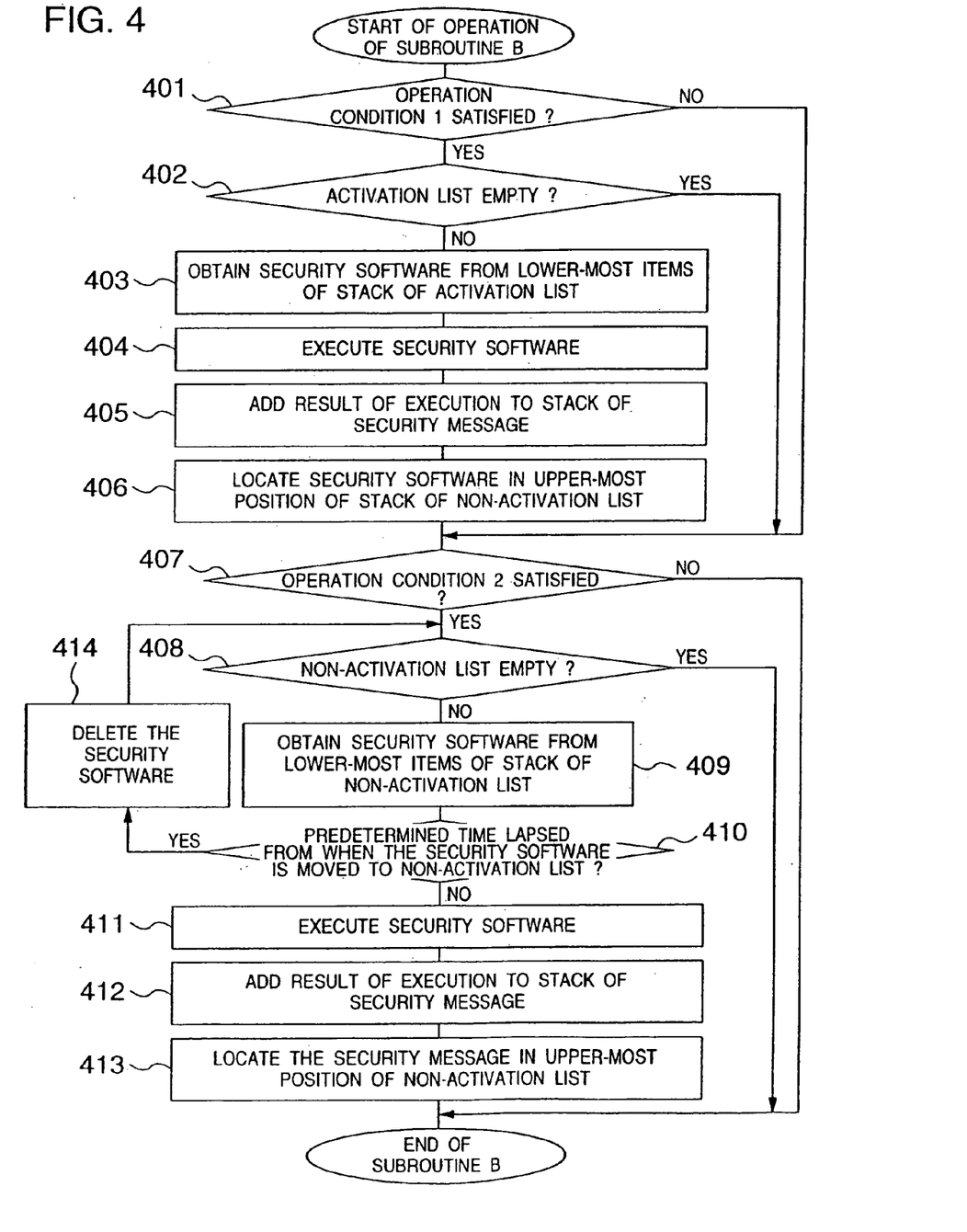
FIG. 4 is a flowchart showing still another processing procedure of the security agent.

FIG. 4 shows details of the procedure of the subroutine 209. This procedure is associated with a list processing of the activation list 111 and the inactivation list 112 of the embodiment.

Prior to execution of this processing, the subroutine 209 calculates a load in accordance with the memory consummation, the disk consummation, and the CPU utilization rate at the activation of the security dedicated software. If the software is inactive for a predetermined period of time, control is passed to another computer (the process is terminated by the computer and the process is then-initiated by another computer). On receiving the "suppression" signal, the subroutine 209 terminates its operation. It is to be appreciated that there is required the capability of the security dedicated software to detect the conditions for operation as described above.

Next, description will be given of each step.

First, in step 401, the subroutine 209 checks to determine presence or absence of condition of operation 1 (transmitting operation to instruct suppression). If the operation is present, control is passed to step 402; otherwise, control is passed to step 407. In step 402, the subroutine 209 checks to determine whether or not the activation list 111 is empty. If empty, control is transferred to step 407; otherwise, control is passed to step 403.

In step 403, the subroutine 209 acquires a security software from the lower-most position of the stack of activation list 111. Subsequently, in step 404, the subroutine 209 initiates the security software (sets the software to an activated state). In step 405, the subroutine 209 adds a result of execution of step 404 to the stack of the security message to transmit the execution result to other computers. In step 406, the subroutine 209 stops the process of the security software to set the software to an inactivated state. Thereafter, the subroutine 209 adds the software to the list of the inactivation list 112.

In step 407, the subroutine 209 checks to determine presence or absence of condition of operation 2 (transmitting operation to instruct activation). If the operation is present, control is transferred to step 408; otherwise, control is passed to step 210. In step 408, the subroutine 209 checks to determine whether or not the inactivation list 112 is empty. If empty, control is passed to step 210; otherwise, control is transferred to step 409. In step 409, the subroutine 209 acquires a security software from the lower-most position of the stack of inactivation list 112. In step 410, the subroutine 209 checks to determine whether or not a period of time has lapsed from a point of time at which the security software is moved to the inactivation list. If this is the case, control is passed to step 414; otherwise, control is transferred to step 411.

In step 411, the subroutine 209 initiates the security software (sets the software to an activated state). In step 412, the subroutine 209 adds a result of execution of step 411 to the stack of security message to transmit the execution result to other computers. In step 413, the subroutine 209 stops the process of the security software and sets the software to an inactivated state and then adds the software to the stack of inactivation list 112. In step 414, the security software is unnecessary for the computer and is the deleted therefrom.

It is to be appreciated that the stacks of the activation and in activation lists can be simply constructed by a queue structure of the first-in-first-out type.

Next, description will be given of another embodiment of the present invention.

Figure 5:
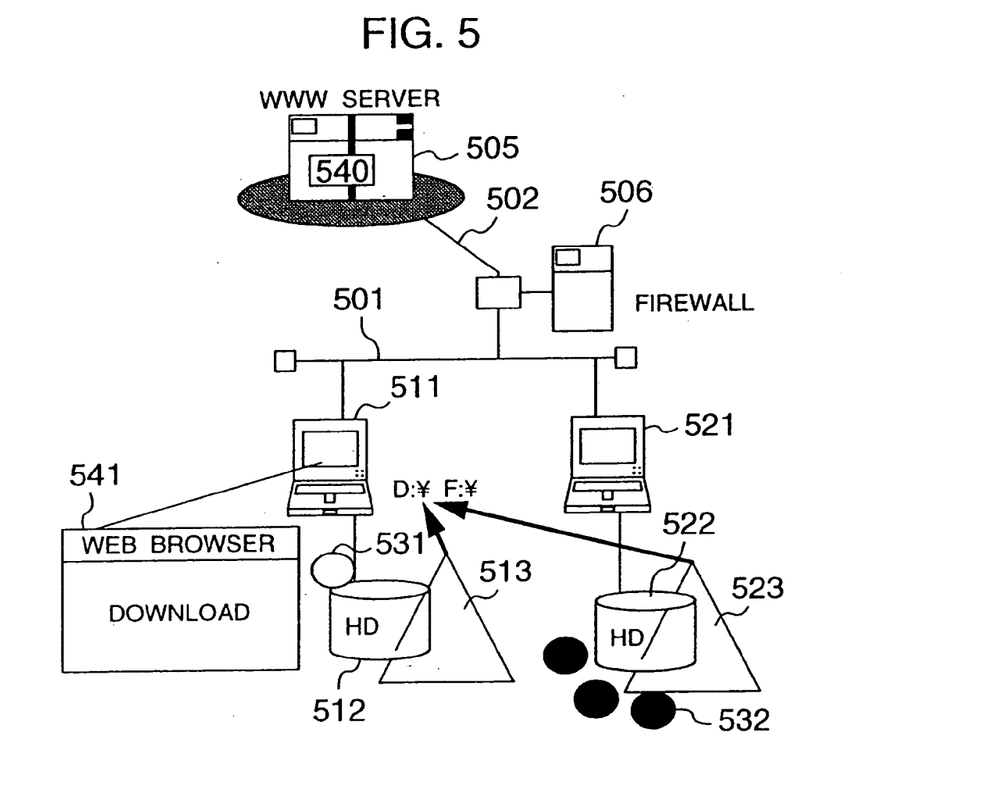
FIG. 5 is a diagram showing structure of a system to cope with a computer virus by a computer in which a security dedicated software is activated.
Figure 7:
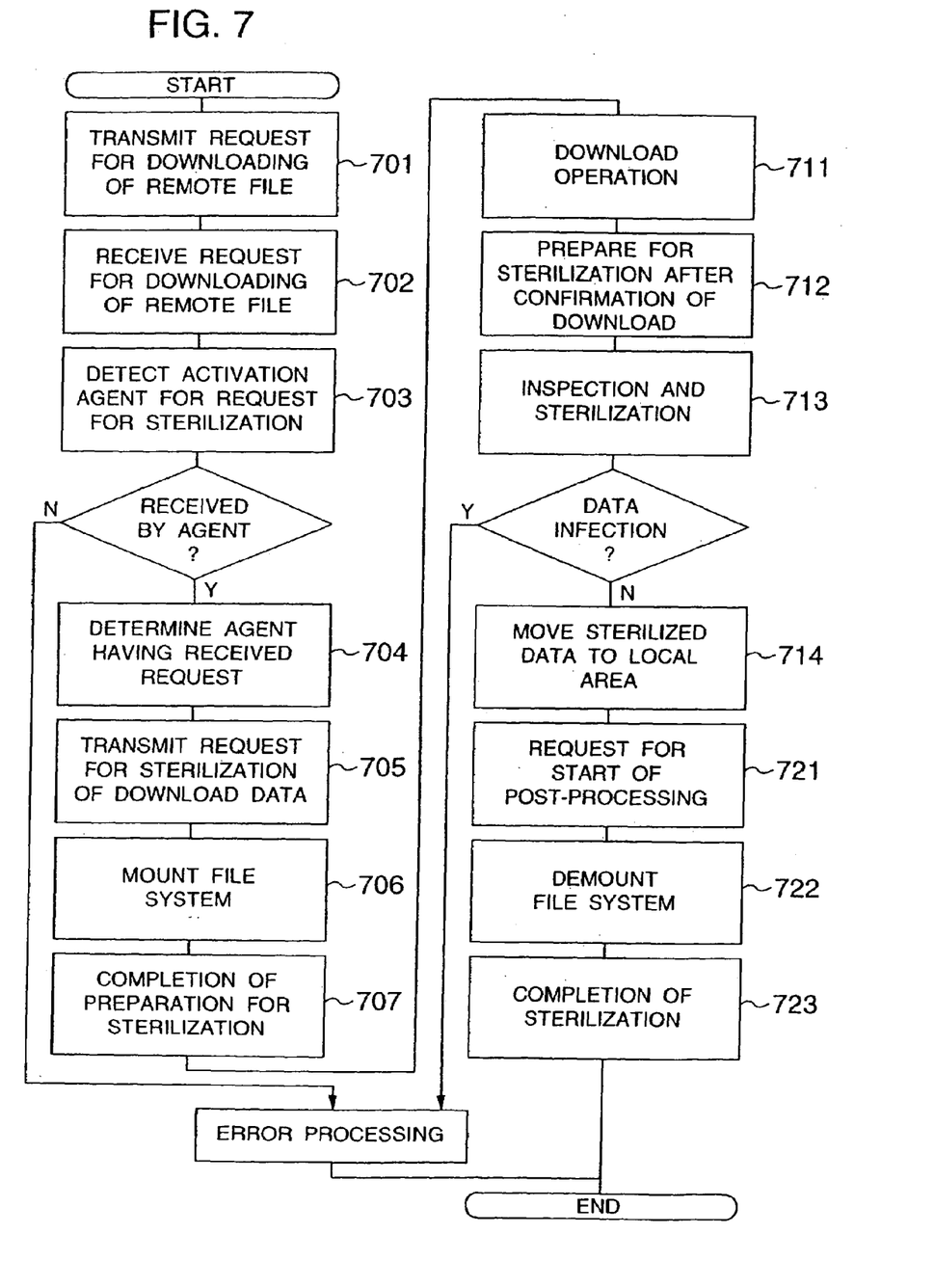
FIG. 7 is a flowchart showing a procedure to cope with a computer virus by a computer in which a security dedicated software is activated.

FIGS. 5 and 7 show the configuration and a flowchart of another embodiment in accordance with the present invention. FIG. 5 shows the system configuration and FIG. 7 is a processing procedure of the system. In this embodiment, when data is introduced from an external system, a computer of which a moving type security first software is assumed as an entrance to the system of the embodiment to thereby conduct the prevention of epidemics in the overall system.

Description will be first given of the hardware configuration by referring to FIG. 5.

A numeral 501 indicates an internal network and a numeral 502 denotes an external network. Numerals 511 and 521 indicate computers (terminal devices) connected to the network 501. A computer 511 has a hard disk 512 and controls a file system 513. A computer 521 has a hard disk 522 to control a file system 523. A numeral 505 indicates a computer (server) connected to the external network 502. A numeral 506 denotes a computer (firewall) to separate the external network 501 from the internal network 502.

Description will be given of the software configuration by referring to FIG. 5.

A numeral 540 indicates a server program which operates on the computer 505 and is, for example, a WWW server program. A numeral 541 is a client program which operates on the computer 511 and is, for example, a WWW client program. Each of the numerals 531 and 532 denotes a security dedicated software, and the software is circulated through computers in the network 501 or is resident in a particular node. In this case, for simplification of explanation, it is assumed that the numeral 531 indicates a fixed type software (called security clerk) on the computer 511 and the numeral 532 denotes a moving type software (called security agent) active on the computer 521.

Referring now to FIG. 7, description will be given of operations of the programs 531 and 532 in which data is downloaded from the program 540 onto the program 541 to be stored on the hard disk 512 as a file of the file system 513.

Next, description will be given of each step of FIG. 7.

(1) Pre-processing

In step 701, the client program 541 issues a request for a file transfer of data managed by the server program 540. In step 702, the server program 540 receives the request from the client 541. In step 703, the client program 541 issues to the security clerk 531 a request of "preparation for sterilization of data to be downloaded". In step 704, the security clerk 531 receives the request of step 704 and makes a search for a computer of which a security agent is activated. For example, the security clerk 531 conducts a broadcast communication to issue a pertinent enquiry to the security agent (or the security clerk) of each computer on the network 501. The security clerk 531 regards a computer from which the answer is first received as the computer of which the security agent is active. Alternatively, when a plurality of security agents are active, there may be employed a method in which the security clerk 531 makes a judgement in accordance with the number of active security agents or the types thereof.

In step 705, the security clerk 531 transmits, in accordance with the judgement in step 704, a request of step 703 to the program 532 operating on the computer 521. In step 706, the security agent 532 having received the request of step 703 prepares for operation. This example shows an operation to mount the file system 523 as a partial tree structure onto the file system 513. Thereafter, the completion of preparation is notified to the security clerk 512.

In step 707, the security clerk 531 transmits to the program 541 such information items obtained in steps 704 to 706 (as a mounting point of the remote file system 523 and a type, an operation procedure, and the like of the security agent 532).

(2) Main Processing

In step 711, the program 541 conducts the download operation in accordance with a conventional file transfer protocol (e.g., FTP). However, the download destination is the remote file system 523 for which the security agent 532 is activated. In step 712, in accordance with information obtained in step 707, the program 541 requests the security agent 532 (again via the security clerk 531) to sterilize the file downloaded in step 711.

In step 713, the security agent 532 conducts the sterilizing operation. When any abnormality is detected, the downloaded data is deleted. Thereafter, a result of operation is returned to the program 541. In step 714, the program 541 moves the sterilized download data from the file system 523 to the file system 513.

(3) Post-processing

In step 721, the program 541 requests the security agent 532 (via the security clerk 531) to demount the file system 523. In step 722, the security agent 541 demounts the file system 523. In step 723, the security agent 532 notifies the completion of the post-processing (via the security clerk 531) to the program 541 to thereby complete the processing operation.

In the embodiment above, for simplification of explanation, the program 531 is a fixed type software and the program 532 is a moving type software. However, the operation above can be achieved regardless of the moving or fixed type of the software. It is an aspect of the embodiment that the program 531 and the program 532 can communicate with each other to cooperatively conduct operation. In the conventional virus inspecting method, a computer (the computer 511 in this example) is infected with a virus in an effective security dedicated software does not exist in the computer. However, in this embodiment, since the presence of a security dedicated software is detected and there exists an entry program (clerk) for the mediation, it is possible to more efficiently inspect the virus.

Figure 6:
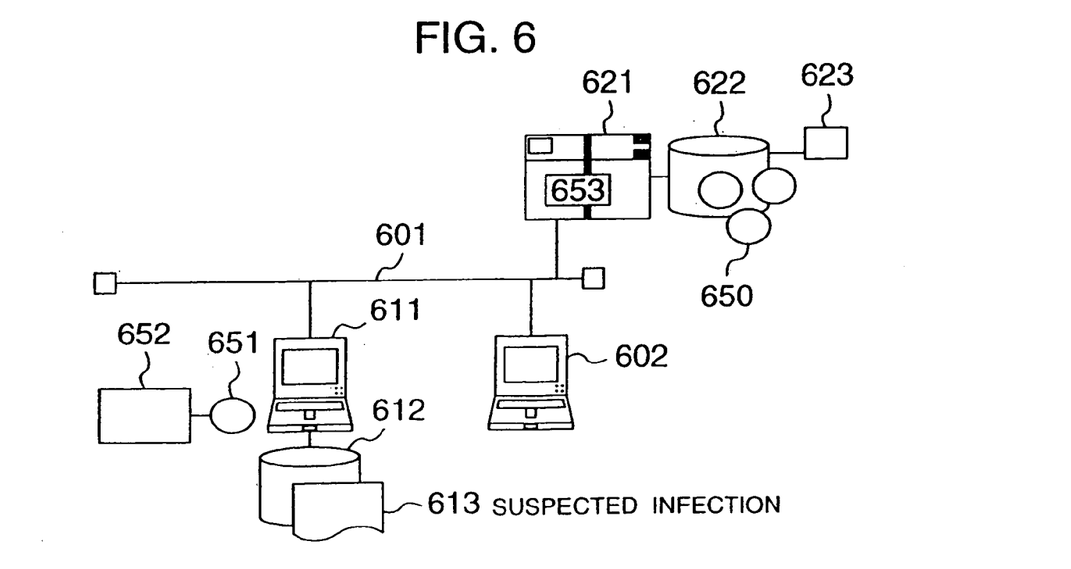
FIG. 6 is a diagram showing a distributed system in which a file suspected for infection with a computer virus is quarantined in the system.
Figure 8:
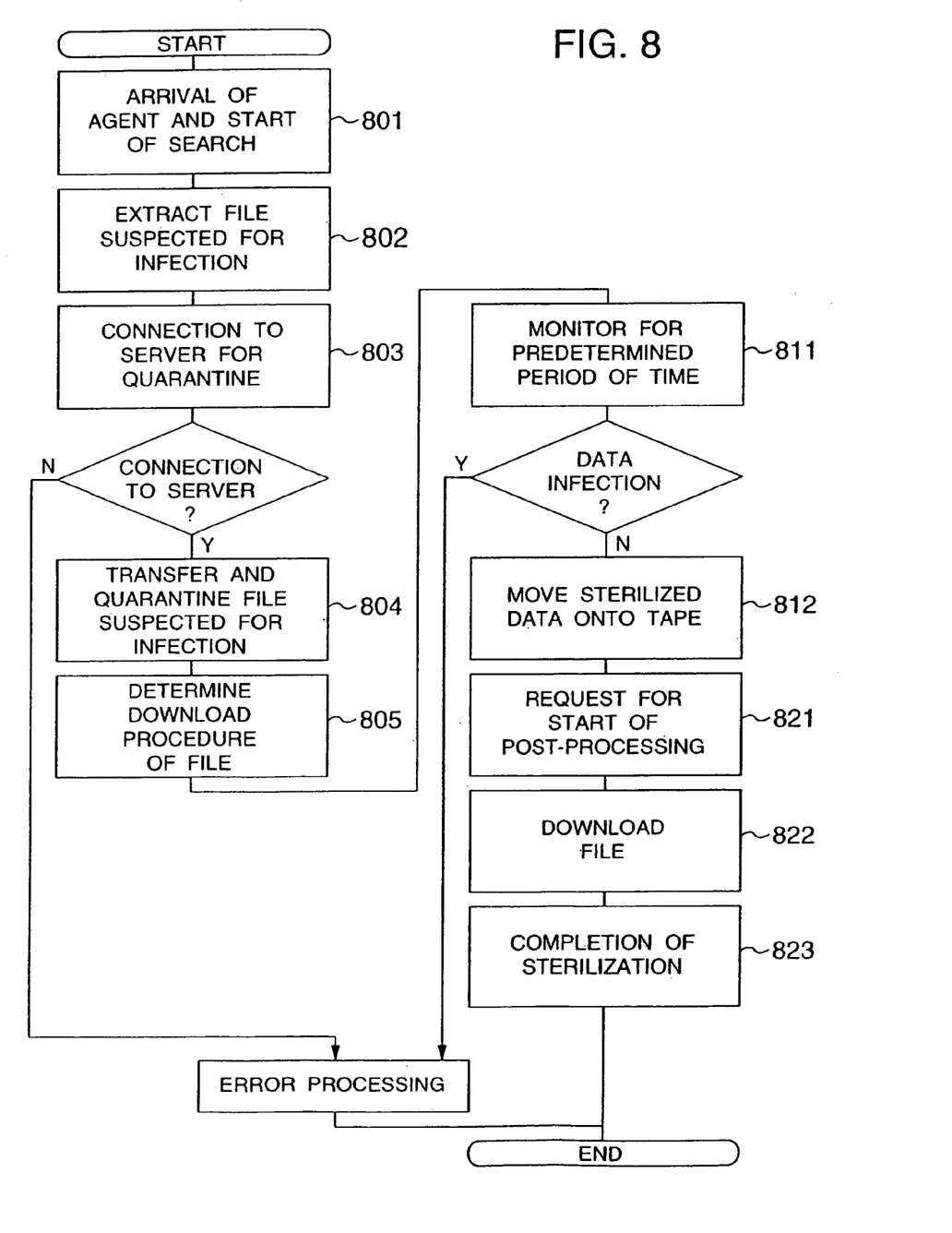
FIG. 8 is a flowchart in which a file suspected for infection with a computer virus is quarantined in the distributed system.

FIGS. 6 and 8 show another embodiment of the utilization method of the present invention. FIG. 6 is a system configuration diagram and FIG. 8 is a processing procedure of the system. In this embodiment, a file associated with occurrence of an injustice due to a virus of a new type is isolated from the distributed system to thereby conduct the prevention of epidemics in the overall system.

Referring to FIG. 6, description will be given of the hardware configuration.

A numeral 601 indicates an internal network. Numerals 602, 611, and 621 are computers connected to the network 601. The computer 611 has a hard disk 612. The computer 621 has a storage medium, for example, a hard disk 622. Moreover, the computer 621 also possesses recording medium 623, for example, a magnetic tape which can be separated from the hard disk 622. On the hard disk 612, there exists a file 613 suspected for the infection with a virus. The computer 621 is a file server in the network 601.

Referring now to FIG. 6, description will be given of the software configuration.

A numeral 650 indicates a fixed type security dedicated software (to be called virus buster in this case) which operates on the computer 621. A numeral 651 denotes a moving type security software (called security agent) which circulates through the network 601. The security agent 651 has a table including a state obtained by the previous inspection of the computer 611 (the state includes, for example, the file system configuration, the contents of the hard disk, and addresses of resident programs in the memory). A numeral 653 denotes a fixed type security dedicated software (security clerk) for the mediation between the virus buster 650 and the security agent 651.

Referring to FIG. 8, description will be given of an operation in which the file 613 suspected for the infection of a virus is provisionally isolated by the file server 621 to prevent the infection with the computer virus of a new type through cooperation of the programs 651, 650, and 653 related to security.

Next, description will be given of each step.

(1) Pre-processing

In step 801, the security agent 651 arrives at the computer 611 and then starts a search. In step 802, in accordance with a list 652 generated as a result of the previous circulation, the security agent 651 makes a search for a file 613 suspected for infection with a computer virus of a new type. As criteria for the suspected files, there may be used, for example, a new file generated after the previous circulation or a file updated also thereafter.

In step 803, the security agent 651 issues to the security clerk 653 a request connection between the file server 621 and the computer 611 via the network 601. In step 804, the security agent 651 transfers the suspected file 613 to the file server 621. In this embodiment, it is more desirable that the file server 621 is disconnected from the network if there is not a request from the security agent 651 to the security clerk 653.

In step 805, the security agent 651 again notifies to the virus buster 650 in advance a procedure of moving the file 613 transferred in step 803 onto the hard disk 612. For example, the file is moved when the security agent 651 again circulates through the computer 611. Alternatively, there may be determined a procedure to move the file 613 when the illness is not detected after lapse of a period of time determined by the system.

(2) Main Processing

In step 811, the virus buster 650 monitors the computer 621 and the hard disk 622. When an injustice is detected, the buster 650 notifies the condition to the manager. In step 812, the virus buster 650 stores the file just transferred from a computer on the network to be separated from the files in which the illness is not detected for a predetermined period of time. For example, the buster 650 saves the file on a medium (magnetic tape) 623 which can be separated from the hard disk. In this embodiment, there are employed two stages in association with the lapse of time and the number of media. However, a multi-stage system may be implemented depending on the system configuration.

(3) Post-processing

In step 821, the security agent 651 issues, in accordance with a procedure determined in step 805, a request to transfer the file 613 stored at the moment on the medium 623 (the illness not detected in the file 613) to the original computer 611. In step 822, the security clerk 653 issues an enquiry to the virus buster 650 for the transfer request in step 821. When the virus buster 650 acknowledges, the security clerk 653 again connects the computer 611 to the computer 621. Thereafter, in step 823, the security clerk 653 transfers the file 613 from the tape 623 of the computer 621 to the hard disk 612 of the computer 611.

Thanks to the configuration of the embodiment above, the problems of the prior art can be solved as follows.

(1) Even when the computer virus simultaneously invades the network system at a plurality of positions thereof, the system can cope with the condition. That is, the security software 118 is added to the ordinary message 117 sent from personal computer A 101 to the WWW server 102, and the software is transmitted to all of the computers which access the WWW server 102 such as personal computer X 103 and personal computer Y 104. Furthermore, the security software 123 generated by the epidemic prevention center 106 is of the promotion type and increases in geometrical progression to propagate through the network 107. Consequently, it is possible to inspect the overall network 107 as quickly as possible to thereby remove any injustice. On the other hand, the security software 118 generated by the Taro's personal computer 105 is of the non-promotion type and hence it takes time for the software 118 to propagate through the entire network 107. However, this is suitable to locally work out the countermeasure through a relatively low-speed monitoring operation. Comparing the system to the human immune system, the network 107 stands for the blood circulating system and the ordinary message 117 circulates as blood therethrough. The WWW server 102 is compared to the heart to circulate blood. The security software units 118 and 123 stand for immune cells moving together with the blood flow and propagate entirely through the human body, namely, the personal computer X 103 and personal computer Y 104 to repulse invading viruses. There are two kinds of immune cells; specifically, the security software 123 which is generated by the epidemic prevention center 106 and which has relatively high reliability is compared to a lymphocyte having a function to increase in number through promotion. The security software 118 generated by the Taro's personal computer 105 is compared to a macrophage to serve a complementary function for the lymphocyte.

(2) Reliability of the security software can be retained. That is, if the security software 118 is falsified while the software 118 is moving through the network 107, the falsified software 118 will not continue its operation. This is because the digital signature 119 is checked for validity thereof in the computer to which the software 118 is moved. Comparing the operation to that of the human body, when the immune cell (security software 118) becomes out of order, the immune system (fixed type security module 108) resident in the destination computer recognizes the condition and kills the cell. Additionally, the security message 120 is compared to an interleukin which is a notification signal between immune systems. When the interleukin is changed in quality, the immune system (fixed type security module 108) recognizes the state and ignores the condition (step 309).

(3) At occurrence of runaway of the security software, it is possible to suppress the runaway. Namely, the execution result 132 of the security software is registered to the WWW server 102. When the epidemic prevention center 106 checks the results 132 and assumes an occurrence of runaway, the center 106 registers a security message 125 including a character string of "suppression" to the WWW server 102 to thereby send a signal to stop operation of the security software to personal computer A. Comparing this operation to that of the human body, the message including "suppression" stands for the interleukin secreted from a suppresser T cell. Similarly, the security message containing "acceleration" is compared to the interleukin secreted from a helper T cell.

As above, in accordance with the embodiment, the problems of the prior art can be solved; moreover, by keeping the executed security software in the inactivation list 112 for a predetermined period of time (step 411), it is possible, when a pertinent invasion occurs, to keep a state in which the countermeasure can be immediately worked out only by receiving the security message with "acceleration". This corresponds to the function of the immune cell of the human body.

(4) The computer virus can be sterilized through the location where the security software exists. This can be regarded as the immune function of the human body. For example, this corresponds to the function to activate an immune cell having a particular function for each of internal organs such as the lung, the stomach, and the intestines which are invasion entrances of external viruses.

(5) It is possible to quickly detect occurrence of a computer virus of a new type. In relation to the human body, this corresponds to the function of an immune cell against viruses in a particular internal organ such as the lever.

INDUSTRIAL APPLICABILITY

In accordance with the present invention, there can be provided a method of and a device for managing a computer network capable of coping with simultaneous invasion of computer viruses at a plurality of positions of the computer network.

Moreover, in accordance with the present invention, there can be provided a method of and a device for managing a computer network capable of ensuring reliability of the security software.

Furthermore, in accordance with the present invention, there can be provided a method of and a device for managing a computer network capable of suppressing runaway of the security software.

Additionally, in accordance with the present invention, there can be provided a method of and a device for managing a computer network capable of improving safety for data from an external network.

Moreover, in accordance with the present invention, there can be provided a method of and a device for managing a computer network capable of immediately detecting occurrence of a computer virus of a new type.

The invention claimed is:

1. A computer network system including a plurality of computers, each including communication means for communicating, comprising:
   a first computer, said first computer comprising means for transmitting moving type security software held by said first computer to one of said plurality of computers;
   a second computer, said second computer comprising fixed type security software, the fixed type security software including:
      means for receiving said moving type security software from said first computer,
      means for storing said moving type security software,
      means for executing said moving type security software,
      means for creating a copy of said moving type security software, and
      means for transmitting the created copy of the moving type security software to one of said plurality of computers; and
   a third computer comprising said fixed type security software, the fixed type security software including:
      means for receiving said moving type security software from said second computer,
      means for storing said moving type security software,
      means for executing said moving type security software, and
      means for creating a copy of said moving type security software; and
      wherein the moving type security software secures safety of at least one of said second and third computers.

2. A computer network system according to claim 1, wherein said moving type security software causes at least one of said second computer and said third computer, each of which stores and executes the moving type software, to detect an injustice conduct by another software therein and output information concerning said detection of injustice conduct.

3. A computer system according to claim 1, wherein said first computer comprises means for transmitting a plurality of moving-type security software units;
   in said second computer, said fixed type security software comprises means for holding a plurality of moving-type security software units; and
   said plurality of moving-type security software units functioning to detect different kinds of injustice conducts, respectively.

4. A computer network system according to claim 1, wherein in said second computer, said fixed type security software comprises means for executing the moving-type security software after receiving said moving-type security software.

5. A computer network system according to claim 1, wherein said moving-type security software attaches a digital signature, and the fixed type security software of said second computer comprises means for verifying said digital signature.

6. A computer network system according to claim 1, wherein the fixed type security software of said second computer comprises means for grasping a status of registration of said moving type security software held by said second computer, and said moving type security software that is not registered in said second computer is introduced.

7. A computer network system according to claim 6, wherein the fixed type security software of said second computer comprises means for registering a moving type security software unit that is not registered among received moving type security software units.

8. A computer network system according to claim 1, further comprising a plurality of third computers, said second computer comprising means for creating a copy of said moving type security software to transmit to said plurality of third computers and means for transmitting the created copy to respective ones of the plurality of third computers.

9. A computer in a computer network system, said computer comprising:
   means for communicating with a plurality of computers; and
   fixed type security software including:
      means for receiving moving type security software transmitted from one of said plurality of computers through said means for communication;
      means for storing and holding said moving type security software;
      means for executing said moving type security software;
      means for creating a copy of said moving type security software, and
      means for transmitting the created copy of the moving type security software to one of said plurality of computers;
      wherein the moving type security software secures the safety of said one of said plurality of computers.

10. A computer according to claim 9, wherein in response to detection of an injustice conduct, said computer outputs information concerning said detection of injustice conduct.

11. A computer according to claim 9, wherein said fixed type security software comprises means for holding a plurality of moving-type security software units, and each of said plurality of moving-type security software units, and each of said plurality of moving-type software units functions to detect a different kind of injustice conduct.

12. A computer according to claim 9, wherein said means for executing the fixed type security software executes said moving-type security software after receiving said moving type security software.

13. A computer according to claim 9, wherein said moving-type security software attaches a digital signature, and the fixed type security software comprises means for verifying said digital signature.

14. A computer according to claim 9, wherein the fixed type security software means comprises means for grasping a status of registration of said moving type security software held by the computer, and said moving-type security software that is not registered in said computer is introduced.

15. A computer according to claim 14, wherein the fixed type security software of said computer comprises means for registering a moving type security software unit that is not registered among received moving type security software units.

* * * * *